Dec. 26, 1922. Re. 15,512

L. J. SAMPSON.
TELEPHONE ATTACHMENT.
ORIGINAL FILED JUNE 14, 1921.

Inventor:
Lloyd J. Sampson
By Attorney
Owen W. Kennedy

Reissued Dec. 26, 1922. Re. 15,512

UNITED STATES PATENT OFFICE.

LLOYD J. SAMPSON, OF WORCESTER, MASSACHUSETTS.

TELEPHONE ATTACHMENT.

Original No. 1,381,343, dated June 14, 1921, Serial No. 310,659. Application for reissue filed March 25, 1922. Serial No. 546,908.

*To all whom it may concern:*

Be it known that I, LLOYD J. SAMPSON, a citizen of the United States, residing at Worcester, in the county of Worcester and Commonwealth of Massachusetts, have invented a new and useful Improvement in a Telephone Attachment, of which the following, together with the accompanying drawings, is a specification.

This invention relates to a coin receptacle particularly adapted for use with a telephone transmitting set of the usual desk type.

In public and business offices, frequent requests are made for use of the telephone, which requests for business reasons are generally granted. As a charge is now commonly made by the telephone companies for each separate call, each such request granted involves some small expense to the office owner.

It is the object of my present invention to provide a coin receptacle for convenient attachment to a telephone transmitting set, the receptacle being entirely supported by and movable with the transmitter support. The attachment is preferably provided with an instruction plate or other insignia to call attention to its purpose, and having further provision for permitting removal of accumulated coins by authorized persons.

My invention further relates to arrangements and combinations of parts hereinafter described and more particularly pointed out in the appended claims.

A preferred form of my invention is shown in the drawings in which.

Like reference characters refer to like parts in the different figures.

Figure 1:
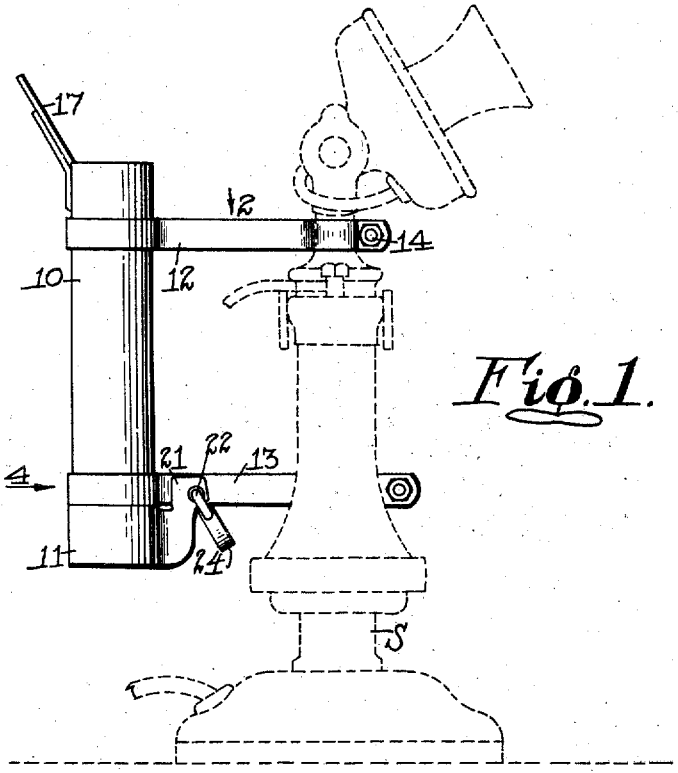
Fig. 1 is a side elevation of my telephone attachment in use.

Referring to the drawings, my improved telephone attachment comprises a coin receptacle 10, having a detachable closure 11 secured to the lower end thereof. A pair of supporting arms 12 and 13 are fixed to the receptacle 10, the outer ends of the arms being forked and being provided with screws 14 and nuts 15 by which the forked ends may be clamped tightly about the upright support S of a telephone transmitter of the usual type.

Figure 2:
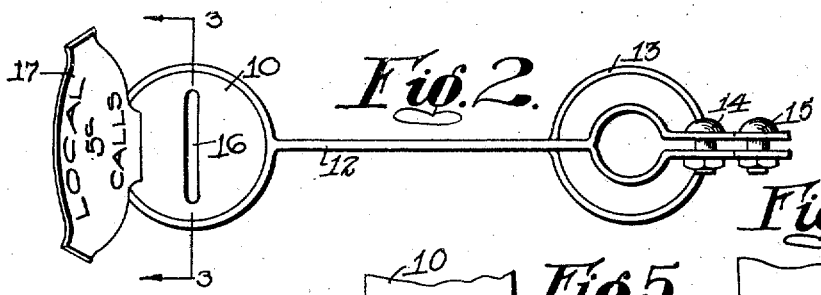
Fig. 2 is a plan view thereof.
Figure 4:
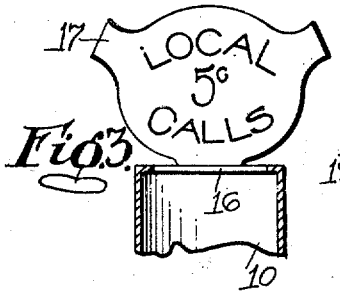
Fig. 4 is a detail rear elevation looking in the direction of the arrow 4 in Fig. 1.
Figure 3:
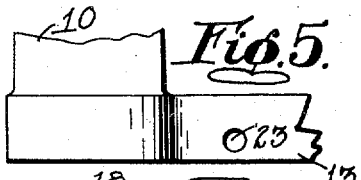
Fig. 3 is a detail sectional view taken along the line 3—3 in Fig. 2.
Figure 5:
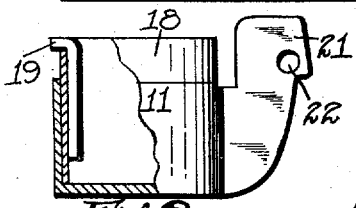
Fig. 5 is a detail side elevation of the lower end of the receptacle.

The type of the receptacle 10 is provided with a slot 16, as shown in Fig. 2, and a sign or instruction plate 17 preferably projects above the top of the receptacle and may be rearwardly inclined, as shown in Fig. 1.

Figure 6:
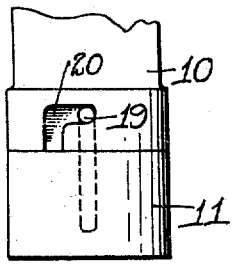
Fig. 6 is a detail side elevation, partly in section, of the detachable closure.

The closure 11 may be formed with an upwardly projecting sleeve 18 (Fig. 6), fitting within the lower end of the receptacle 10, and an outwardly projecting lug 19 may also be provided thereon, adapted to be received in an L shaped slot 20 in the receptacle 10, the projection and slot cooperating to form a bayonet lock.

The closure 11 is also provided with an upwardly projecting arm 21 positioned closely adjacent the supporting arm 13 when the closure is in operative position. Holes 22 and 23 are provided in the arms 21 and 13, through which holes a suitable retaining device, such as a lock 24, may be passed to secure the closure to the receptacle supporting arm and to prevent relative angular movement of the closure and receptacle. Without such movement the bayonet lock absolutely prevents longitudinal removal of the closure or opening of the receptacle.

It will be seen that I have not only provided a convenient and safe coin receptacle which does not lessen the portability of the instrument, but that I have also made provision for securing the receptacle in such a position that it can not be overlooked by any person using the telephone. It is found in practice that a silent reminder of this sort is effective in collecting payment for a very large proportion of the calls made by outside parties, or for other than business purposes.

Having thus described my invention it will be evident that changes and modifications can be made therein by those skilled in the art within the scope of my invention as set forth in the claims, and I do not wish to be otherwise limited to the details herein disclosed, but what I claim is:—

1. A telephone attachment having, in combination, a tubular coin receptacle, means to clamp said receptacle on a transmitter support of the desk type, said receptacle being entirely supported thereby and movable therewith and being spaced above the base of said transmitter support, a downwardly removable detachable closure for the lower end of said receptacle having a projecting lug thereon, means effective to prevent relative axial movement of said receptacle and closure when in operative position, and locking means coacting with said lug to prevent relative angular movement of said parts.

2. A telephone attachment having, in combination, a tubular coin receptacle, means to clamp said receptacle on a transmitter support of the desk type, said receptacle being entirely supported thereby and movable therewith and being spaced above the base of said transmitter support, a downwardly removable detachable closure for the lower end of said receptacle, said closure having a projecting arm, a bayonet lock between said closure and said receptacle, and an external lock to secure said projecting arm to said clamping means.

3. A telephone attachment having, in combination, a tubular coin receptacle, means to clamp said receptacle on a transmitter support of the desk type, said receptacle being entirely supported thereby and movable therewith, and being spaced above the base of said transmitter support, a detachable closure for one end of said receptacle, means effective to limit relative axial movement of said receptacle and said closure when in operative position, and means coacting with said receptacle clamping means to prevent relative angular movement of said parts.

4. A telephone attachment having, in combination, a tubular coin receptacle, means to clamp said receptacle on a transmitter support of the desk type, said receptacle being entirely supported thereby and movable therewith, and being spaced above the base of said transmitter support, a detachable closure for one end of said receptacle, and means for securing said closure to said receptacle by cooperation with said receptacle clamping means.

5. In a telephone attachment, the combination with a transmitter support of the desk type, of a tubular coin receptacle having a detachable closure at one end thereof, an arm for clamping said receptacle to said transmitter support whereby the receptacle is entirely supported by and movable with the said support, and means coacting with said arm to prevent removal of said closure from said receptacle.

6. In a telephone attachment, the combination with a transmitter support of the desk type, of a tubular coin receptacle having a detachable closure at one end thereof and a projection on said closure, an arm for clamping said receptacle to said transmitter support, whereby the receptacle is entirely supported by and spaced above the base of said transmitter support, and means coacting with said projection to prevent removal of said closure from said receptacle.

LLOYD J. SAMPSON.